United States Patent [19]
Tsuzuki et al.

[11] Patent Number: 5,922,444
[45] Date of Patent: Jul. 13, 1999

[54] GLAZE COMPOSITION

[75] Inventors: Masashi Tsuzuki, Konan; Masahiko Okuyama, Nagoya, both of Japan

[73] Assignee: NGK Spark Plug Co., Ltd., Aichi-ken, Japan

[21] Appl. No.: 08/310,999

[22] Filed: Sep. 22, 1994

Related U.S. Application Data

[62] Division of application No. 08/141,626, Oct. 27, 1993, abandoned.

[30] Foreign Application Priority Data

| Oct. 27, 1992 | [JP] | Japan | ................................... | 4-288864 |
| Sep. 9, 1993 | [JP] | Japan | ................................... | 5-224619 |
| Sep. 9, 1993 | [JP] | Japan | ................................... | 5-224620 |
| Oct. 14, 1993 | [JP] | Japan | ................................... | 5-257021 |

[51] Int. Cl.$^6$ ............................ B32B 17/06; B32B 18/00
[52] U.S. Cl. ...................... 428/220; 428/427; 428/428; 428/432; 428/446; 428/701; 428/702; 428/704; 428/697; 501/14; 501/22; 501/24; 501/26; 501/47; 501/48; 501/50; 501/52; 501/79; 501/77; 501/78
[58] Field of Search .................... 428/697, 701, 428/702, 446, 213, 432, 427, 428, 704, 220; 501/14, 21, 22, 24, 26, 27, 28, 29, 63, 73, 77, 41, 45, 46, 47, 48, 49, 50, 52, 79, 78

[56] References Cited

U.S. PATENT DOCUMENTS

| 3,510,325 | 5/1970 | Broemer et al. ......................... 501/77 |
| 3,544,330 | 12/1970 | Hoffman ................................... 501/71 |
| 4,268,313 | 5/1981 | Park et al. ............................... 501/77 |
| 4,366,253 | 12/1982 | Yagi .......................................... 501/63 |
| 4,624,934 | 11/1986 | Kokubu ..................................... 501/17 |
| 4,746,578 | 5/1988 | Kondo ..................................... 428/432 |
| 4,839,313 | 6/1989 | Kondo ....................................... 501/14 |
| 5,100,842 | 3/1992 | Stevenson et al. ....................... 501/77 |
| 5,124,282 | 6/1992 | Prabhu ....................................... 501/5 |
| 5,137,849 | 8/1992 | Brix et al. ................................ 501/77 |
| 5,153,070 | 10/1992 | Andrus ..................................... 428/408 |

FOREIGN PATENT DOCUMENTS

| 456351 | 11/1991 | European Pat. Off. ........ C03C 3/064 |
| 60-118648 | 6/1985 | Japan . |
| 60-55453 | 12/1985 | Japan . |
| 61-24345 | 6/1986 | Japan . |
| 61-59557 | 12/1986 | Japan . |
| 62-15493 | 4/1987 | Japan . |

*Primary Examiner*—Ellis Robinson
*Attorney, Agent, or Firm*—Sughrue, Mion, Zinn, Macpeak & Seas, PLLC

[57] ABSTRACT

A glaze composition suitable for a thin chip substrate, for example. The glaze composition makes a low-temperature glazing possible and is superior in the electrical and chemical stability. The glaze composition can prevent even a thin substrate from warping and can easily form an extensive smooth glaze layer without deteriorating a thin glaze face. The components of the composition are 20% to 50% by weight of boron oxide, 5% to 35% by weight of aluminum oxide, and 15% to 55% by weight of at least one alkaline-earth oxide selected from the group consisting of calcium oxide, strontium oxide, magnesium oxide and barium oxide.

21 Claims, No Drawings

GLAZE COMPOSITION

This is a divisional of application Ser. No. 08/141,626 filed Oct. 27, 1993 abandoned.

BACKGROUND OF THE INVENTION

This invention relates to a glaze composition for enhancing the surface smoothness of, for example, a ceramic substrate, and particularly to a glaze composition suitable for the manufacture of thin-film hybrid parts using thin-film or thin/thick-film techniques, such as chip capacitors, chip resistors and chip inductors.

Conventionally, a glaze composition is known as the composition for remarkably enhancing the surface smoothness of a ceramic substrate. The glaze composition is provided with heat accumulating, electric insulating and other superior vitreous properties. These properties are utilized by thermal heads and various other parts.

(1) The glaze composition, superior in surface smoothness, for thermal heads generally included an alkaline metal and lead, which raises the manufacturing efficiency of the glaze composition.

(2) Recently, a glaze composition for a high-speed or photographic printing thermal head was composed mainly of thermally resistant silicon dioxide, without including an alkaline metal or lead. Such a high-temperature glaze composition was disclosed in, for example, Japanese Examined and Published Patent Application Nos. 60-55453 and 61-24345, and Japanese Laid-open Patent Application No. 60-118648.

Nowadays glaze compositions are developed for use in chips in addition to the thermal heads. To meet the demands for light, thin, short, small but highly-precise electronic parts, a ceramic substrate with a glaze layer formed on the surface thereof is replacing conventional chip substrates. This glazed substrate has a superior surface smoothness, and thin or thick film patterns can be formed on the surface of the substrate with fine pattern pitches.

If the aforementioned conventional glaze composition (1), containing a large amount of alkaline metal and lead is used for a chip substrate, at the time of the application of voltage the alkaline metal decreases the electric insulation while moving through glass, thereby deteriorating electric reliability. When the glaze composition is burnt in a reducing atmosphere, the reduction of lead oxides turn glass black and the high electric insulation, i.e. a specific volumetric resistance of $10^{14}$ $\Omega$.cm or more, cannot be maintained. In addition, the use of lead is undesirable because lead is a toxic substance.

The aforementioned high-temperature glaze composition (2) mainly composed of silicate was developed so as to pursue the high heat resistance. If the thermal expansion coefficient of the composition fails to coincide accurately with that of the ceramic substrate, the ceramic substrate would warp. Since the high-melting glass requires a high fixing temperature when formed integrally on the substrate, even a slight difference of the glass from the substrate in the thermal expansion coefficient would cause the substrate to warp. Since the ceramic substrate requires a sufficient thickness for withstanding such warping, a desirably thin chip substrate is difficult to be formed.

At the time of glaze burning, the high-melting glass develops such a high viscosity that the end portions of glaze composition become remarkably protuberant relative to the entire thin glaze composition. This is not disadvantageous for partial glazing, but provides insufficient smoothness to the entire surface cover or band-shaped glaze patterns to be formed on the chip substrate.

The thermal resistance of the glazed substrate is an essential property for thermal heads, but is an unnecessarily quality for thin-film hybrid parts. The glazed substrate for the hybrid parts needs to be calcined in high temperatures. Therefore, a glazed substrate having a high thermal resistance is uneconomical for use of the thin-film hybrid parts.

The desired glaze thickness of the glazed substrate for thin-film hybrid parts is between about 5 $\mu$m and about 25 $\mu$m, while that of the conventional glazed substrate for facsimile thermal heads is between 60 $\mu$m and 80 $\mu$m. When a conventional glaze composition is made thin and the glazing viscosity is high, the composition is influenced by the irregular surface of the ceramic substrate. Therefore, the glaze composition provides insufficient surface smoothness. Such deterious change of the glaze face is undesirable. These days a glaze composition which can provide a very thin and flat but high-quality glaze face is demanded.

SUMMARY OF THE INVENTION

Wherefore, an object of this invention is to provide a glaze composition suitable for the glaze substrates for thin-film hybrid parts or for other chip substrates. The glaze composition should also lower the glazing temperature, and have a superior electric insulation and chemical stability. Moreover, the glaze composition rarely results in the irregularities on the surface of substrates and in much protuberance of the end portions of glaze composition.

Another object of the invention is to provide a glaze composition which especially can preferably prevent even a thin substrate from warping.

A further object of the invention is to provide a glaze composition which can easily form an extensively smooth glaze layer without deteriorating a thin glaze face.

To attain these or other objects, a first embodiment of the present invention provides a glaze composition comprising indispensable components on the basis of oxide weight. The indispensable components are 20 to 50% by weight of boron oxide, 5 to 35% by weight of aluminum oxide and 15 to 55% by weight of at least one alkaline-earth oxide selected from the group consisting of calcium oxide, strontium oxide, magnesium oxide and barium oxide. The total amount of these components equals or exceeds 90% by weight of the entire composition.

A second embodiment of the present invention provides a glaze composition including, on the basis of oxide weight, 20 to 50% by weight of boron oxide, 5 to 35% by weight of aluminum oxide, 0 to 40% by weight of silicon dioxide, 0 to 8% by weight of zinc oxide and 15 to 55% by weight of at least one alkaline-earth oxides selected from the group consisting of calcium oxide, strontium oxide, magnesium oxide and barium oxide. The total of these indispensable components amounts at least 90% by weight of the entire composition.

A third embodiment of the present invention provides a glaze composition including, on the basis of oxide weight, 20 to 50% by weight of boron oxide, 5 to 35% by weight of aluminum oxide, 0 to 40% by weight of silicon dioxide and 15 to 55% by weight of at least one alkaline-earth oxides selected from the group consisting of calcium oxide, strontium oxide, magnesium oxide and barium oxide. The total of these indispensable components amounts at least 90% by weight of the entire composition.

According to a fourth embodiment of the present invention, the breakdown, on the basis of oxide weight, of the alkaline-earth oxide according to the first, second or third embodiment is preferably 1.5 to 30% by weight of calcium oxide, 0 to 30% by weight of strontium oxide, 0 to 10% by weight of magnesium oxide and 0 to 45% by weight of barium oxide.

A fifth embodiment of the present invention provides a glaze composition comprising, on the basis of oxide weight, 15 to 40% by weight of boron oxide, 10 to 30% by weight of aluminum oxide, up to 40% by weight of silicon dioxide, 10 to 40% by weight of at least one alkaline-earth oxide selected from the group consisting of calcium oxide, strontium oxide and barium oxide, and 3 to 30% by weight in total of at least one oxide selected from the group consisting of up to 30% by weight of lanthanum sesquioxide, up to 20% by weight of yttrium oxide and up to 10% by weight of zirconium dioxide. The total of these components equals or exceeds 90% by weight or more of the entire composition.

A sixth embodiment of the present invention provides that the breakdown of the alkaline-earth oxide, according to the fifth embodiment, is preferably 1.5 to 30% by weight of calcium oxide, up to 20% by weight of strontium oxide and up to 10% by weight of barium oxide.

A seventh embodiment of the present invention provides a glaze composition comprising, on the basis of oxide weight, 15 to 40% by weight of boron oxide, 10 to 30% by weight of aluminum oxide, 0.5 to 17% by weight of phosphorous pentoxide, up to 40% by weight of silicon dioxide and 15.5 to 40% by weight of at least one alkaline-earth oxide selected from the group consisting of calcium oxide, strontium oxide and barium oxide. The total of these components equals or exceeds 90% by weight or more of the entire composition.

An eighth embodiment of the present invention provides that the breakdown of the alkaline-earth oxide, according to the seventh embodiment, is preferably 1.5 to 25% by weight of calcium oxide, up to 20% by weight of strontium oxide and up to 10% by weight of barium oxide.

As aforementioned, the content of each component of the glaze composition, according to the present invention, is specified or limited for the following reasons.

1) Boron oxide is a requisite glass-forming oxide in the present invention. If the content of boron oxide is less than the specified lower limitation, crystallization easily occurs and the melting point of the glaze composition is increased. If the content of the boron oxide exceeds the specified upper limitation, the glaze composition has insufficient thermal resistance and water proofness.

2) In addition to boron oxide, aluminum oxide is another glass forming oxide. If the content of aluminum oxide is below the specified lower limitation, the chemical durability of the glaze composition is remarkably lowered. If the content of the aluminum oxide exceeds the specified upper limitation, the glaze composition has a high melting point and easily crystallizes.

3) Phosphorus pentoxide is a characteristic component of the present invention. The addition of phosphorus pentoxide enhances the surface smoothness. Phosphorus pentoxide increases the thermal expansion coefficient but decreases the chemical durability. If the content of the phosphorus pentoxide is below the specified lower limitation, no remarkable surface smoothness can be provided. If the content of the phosphorus pentoxide exceeds the specified upper limitation, crystallization easily occurs and the surface smoothness is lost.

4) The addition of silicon dioxide enhances the oxidation and water resistance of the glaze composition. If the content of silicon dioxide exceeds 40% by weight, the melting point of the glaze composition is increased, which fails to suit the application of the present invention.

5) The addition of alkaline-earth oxides such as calcium oxide, strontium oxide and barium oxide adjusts the thermal expansion coefficient and promotes vitrification. If the content of alkaline-earth oxides is below the specified lower limitation, vitrification does not readily occur, and if the alkaline-earth oxide content exceeds the specified upper limitation, crystallization readily occurs.

Among the alkaline-earth oxides, calcium oxide is the most desirable because it greatly promotes vitrification. The effectiveness cannot be remarkable, however, if the content of calcium oxide is below the specified lower limitation. If the calcium oxide content exceeds the specified upper limitation, the thermal expansion coefficient is remarkably lowered and crystallization readily occurs.

By replacing a part of calcium oxide with strontium oxide and barium oxide, the thermal expansion coefficient can be adjusted. The combined effectiveness of the alkaline-earth oxides can be obtained. Further, the extent of vitrification is enhanced. If the content of strontium oxide and barium oxide exceeds the specified upper limitation, crystallization remarkably occurs.

6) The oxides like lanthanum sesquioxide, yttrium oxide, and zirconium dioxide are characteristic admixtures of the present invention. These admixtures increase the vitreous thermal expansion coefficient without largely changing the vitreous property of the other components. If the total content of the oxides exceeds 30% by weight, crystallization results.

If the content of yttrium oxide exceeds 20% by weight and that of zirconium dioxide exceeds 10% by weight, the tendency toward crystallization is undesirably intensified.

7) Other desirable admixtures are magnesium oxide, zinc oxide, bismuth trioxide, titanium dioxide and the like.

If only a small amount of magnesium oxide is added, it provides the desirable effectiveness of an alkaline-earth oxide (hereinafter referred to RO as necessary) in the same way as calcium oxide, strontium oxide and barium oxide.

The addition of only a small amount of zinc oxide promotes vitrification, but an excessive addition remarkably intensifies the tendency toward crystallization.

The addition of only a small amount of bismuth trioxide and titanium dioxide enhances the chemical durability, but an excessive addition intensifies the tendency toward crystallization.

8) Alkaline-metal, lead and other oxides are undesirable because they deteriorate the reliability of electronic parts. Although they lower chemical durability, they enhance the productivity. Therefore, they may be used unless they adversely affect subsequent process steps.

The glaze composition according to the present invention is far different from the conventional one as mentioned below.

1) Conventional glaze compositions differ from each other in the content of lead and alkaline metals, thermal resistance and other factors. All of them, however, are composed of silicate glass. The content of silicon dioxide becomes 50 mol % or more, if the glass composition is converted in terms of mol % of oxide. The usual content of silicon dioxide is between 60 and 75 mol %. In a conventional glaze composition, the oxide for forming a glass network as the glass-forming framework is the ion of silicon tetroxide.

The chemical durability, the thermal resistance and the other basic properties of silicate glass are supposedly utilized in the conventional glaze composition. As aforementioned, however, the conventional composition fails to satisfy the requirements of the glazed substrate for the current thin-film hybrid parts.

2) The framework of the $B_2O_3$—$Al_2O_3$—RO system glaze composition, according to the present invention, is a tetrahedron of boron tetroxide anion and aluminum tetroxide anion. Alternatively, the $B_2O_3$—$Al_2O_3$—$P_2O_5$—RO system glaze composition of the present invention has a framework of tetrahedron of the phosphorous tetroxide trianion. The structure of the present invention of the convention from that of the conventional glaze compositions.

Specifically, the glass-forming framework of the tetrahedron of boron tetroxide anion and aluminum tetroxide anion provides a superior characteristic property. Since the glass of the present invention includes a small amount of silicon dioxide and has an appropriate ratio of alkaline-earth metal, boron and aluminum can both form a stable tetrahedron coordination: boron has a coordination number of 3 or 4 relative to oxygen and aluminum has a coordination number of 4 or 6. The combination of low thermal properties, superior surface smoothness and reliability is thus attained.

The conventional system glaze composition of the alkaline metal or alkaline-earth metal combined with B2O3 known as the low-melting glass is inferior in chemical durability and electrical insulation, which does not coincide with the objects of the present invention. Because boron having a coordination number of 3, relative to oxygen, forms an unstable framework. Consequently, to attain the effectiveness of the present invention, aluminum oxide or phosphorus pentoxide is another indispensable component together with the boron oxide and the alkaline-earth oxide.

3) The present invention was developed based on the discovery that the aforementioned glaze composition forms a suitable glaze for thin-film hybrid parts having the combination of low thermal properties, surface smoothness, high chemical durability and other reliable properties. Further, the present invention was completed based on the discovery that the addition of specified oxides effectively prevents a glazed substrate from warping because of differences in the thermal expansion coefficient between a ceramic substrate and a glaze composition.

Specifically, the glaze composition of the present invention makes low-temperature glazing possible, provides superior chemical durability and high electric insulation in the same way as conventional silicate glasses, and can appropriately control the thermal expansion coefficient of the glaze composition by adjusting the amount of specified additive oxides without changing the excellent properties of the glaze composition. The thermal expansion coefficient is thus controlled so that even a thin ceramic substrate can be prevented from warping. Further, the present invention was developed based on the discovery that even a thin glaze layer can have a smooth surface and other superior properties.

DETAILED DESCRIPTION OF THE PREFERRED EMBODIMENTS

First Embodiment

To obtain the fusion having a composition shown in Table 1, orthoboric acid, aluminum hydroxide, calcium carbonate, strontium carbonate, barium carbonate, magnesium carbonate, silicon dioxide, zinc oxide, orthophosphoric acid, sodium carbonate, potassium carbonate and lead tetroxide were individually weighed and mixed in a mill. The mixture was melted in a platinum-rhodium crucible at 1200° C. to 1450° C. (2192° F. to 2642° F.) for three to five hours, and were then rapidly water-cooled. Consequently, the glaze compositions of Nos. 1–13 embodying the present invention, shown in Table 1, were prepared.

FIRST REFERENCE EXAMPLE

In the same way as the first embodiment, the glaze compositions of Nos. 14–16 outside the scope of the present invention, a conventional high-temperature glaze composition No. 17 composed mainly of silicon dioxide without including alkaline metal or lead, and a conventional glaze composition No. 18 including alkaline metal and lead were prepared, as shown in Table 1.

TABLE 1

| NO. | GLASS COMPOSITION [% BY WEIGHT] | | | | | | | |
|---|---|---|---|---|---|---|---|---|
| | $B_2O_3$ | $Al_2O_3$ | $SiO_2$ | CaO | SrO | MgO | BaO | OTHER COMPONENTS |
| EMBODIMENT | | | | | | | | |
| 1 | 26.7 | 26.0 | 15.3 | 14.3 | 4.0 | — | 13.7 | — |
| 2 | 31.1 | 5.7 | 10.1 | 4.4 | — | 1.3 | 42.9 | ZnO:4.5 |
| 3 | 22.0 | 16.1 | 37.9 | 17.7 | — | 6.3 | — | — |
| 4 | 31.2 | 30.4 | 17.9 | 8.4 | — | 12.0 | — | — |
| 5 | 37.3 | 5.5 | 6.4 | 1.8 | 7.8 | — | 41.2 | — |
| 6 | 41.9 | 6.1 | 7.2 | 2.0 | 24.9 | — | 12.9 | ZnO:5.0 |
| 7 | 30.1 | 31.5 | 7.4 | 13.9 | 3.8 | — | 13.3 | — |
| 8 | 47.2 | 13.8 | 16.3 | 10.2 | 2.8 | — | 9.7 | — |
| 9 | 27.0 | 26.4 | 15.6 | 10.9 | 20.1 | — | — | — |
| 10 | 27.0 | 29.2 | 12.9 | 28.2 | — | 0.3 | — | — |
| 11 | 27.6 | 20.2 | 17.4 | 14.8 | 9.6 | — | 6.1 | $P_2O_5$:4.4 |
| 12 | 26.3 | 15.4 | 18.9 | 14.1 | 3.9 | 0.2 | 13.5 | PbO:7.6 |
| 13 | 27.2 | 19.4 | 20.6 | 15.1 | 9.8 | 0.6 | 6.2 | $Na_2O$:0.4, $K_2O$:0.6 |
| REFERENCE | | | | | | | | |
| 14 | 18.5 | 27.9 | 20.3 | 14.9 | 4.1 | — | 14.3 | — |
| 15 | 26.0 | 38.1 | 15.0 | 9.3 | 2.6 | — | 8.9 | — |
| 16 | 28.6 | 27.7 | 32.6 | 5.1 | 1.4 | — | 4.9 | — |
| 17 | 1.0 | 9.2 | 61.3 | 15.2 | 4.7 | 0.2 | 8.5 | — |
| 18 | 18.1 | 4.9 | 39.0 | 6.0 | — | 1.0 | 9.0 | $Na_2O$:3.0, $K_2O$:1.0, PbO:18.0 |

Measurement

The glass softening point and the thermal expansion coefficient of the glaze compositions of Nos. 1–18 were measured. The measurement results are shown in Table 2. Since the reference compositions of Nos. 15–16 were not vitrified when melted, the vitreous thermal properties were not able to be measured. The glass softening point shown in Table 2 is the temperature corresponding to the second endothermic peak reached when a differential thermal analysis was conducted. The thermal expansion coefficient was obtained from the thermal expansion gradient of a cylindrical glass having a diameter of about 3 mm to 5 mm (about 0.12 inches to 0.20 inches) and a length of 20 mm (0.79 inches). The expansion gradient was obtained based on the measurements of the length of the cylindrical glass during the heating from a room temperature to 400° C. (752° F.).

The reference glaze compositions represent significant differences in appearance from the glaze compositions of the first embodiment.

By using the glaze compositions of Nos. 1, 2, 17 and 18, the following printing step was carried out: a printing glass paste was printed on an alumina substrate having a size of 100 mm×100 mm×0.5 mm×(3.94 inches×3.94 inches×0.020 inches). Then, the alumina substrate was burnt at temperatures shown in Table 2, so that 70% of the surface area of the alumina substrate was covered with a 20 μm thick glaze. Table 3 shows the protuberance dimension, the average

TABLE 2

| NO. | GLASS SOFTENING POINT[° C.] | THERMAL EXPANSION COEFFICIENT[1/K] | BAKING TEMPERATURE [° C.] | NOTES |
|---|---|---|---|---|
| EMBODIMENT | | | | |
| 1 | 735 | $6.7 \times 10^{-6}$ | 850 | — |
| 2 | 710 | $6.7 \times 10^{-8}$ | 800 | — |
| 3 | 805 | $5.5 \times 10^{-6}$ | 1020 | — |
| 4 | 810 | $5.3 \times 10^{-6}$ | 1000 | — |
| 5 | 720 | $6.7 \times 10^{-6}$ | 850 | — |
| 6 | 730 | $6.1 \times 10^{-6}$ | 900 | — |
| 7 | 750 | $6.6 \times 10^{-6}$ | 880 | — |
| 8 | 750 | $6.2 \times 10^{-6}$ | 900 | — |
| 9 | 765 | $5.5 \times 10^{-6}$ | 950 | — |
| 10 | 755 | $6.8 \times 10^{-6}$ | 930 | — |
| 11 | 750 | $7.0 \times 10^{-6}$ | 930 | — |
| 12 | 755 | $6.7 \times 10^{-6}$ | 930 | — |
| 13 | 765 | $6.6 \times 10^{-6}$ | 950 | — |
| REFERENCE | | | | |
| 14 | 793 | $7.1 \times 10^{-6}$ | CRYSTALLIZE | UNABLE TO GLAZE |
| 15 | — | — | — | NOT VITRIFIED |
| 16 | — | — | — | NOT VITRIFIED |
| 17 | 970 | $6.0 \times 10^{-6}$ | 1240 | — |
| 18 | 790 | $5.5 \times 10^{-6}$ | 1020 | — |

Subsequently, the glaze compositions of Nos. 1–18, respectively, were respectively wet-ground in an alumina pot mill. The finely ground glass particles were mixed with ethyl cellulose system binder and organic solvent, to prepare a printing glass paste.

The printing glass paste was printed on the surface of an alumina substrate, which is composed of aluminum oxide having a purity of 97% and has a size of 50 mm×50 mm×0.635 mm (1.97 inches×1.97 inches×0.025 inches). Subsequently, the printed substrates were baked at respective appropriate temperatures as shown in Table 2. Thus, the substrates having on the surface thereof a 5 mm (about 0.20 inches) wide and 20 μm thick glaze band were prepared.

As a result of observation over the glazed substrates, the glaze compositions of Nos. 1–13 of the first embodiment each preferably had a lustrous glaze face, although the thickness of glaze was 20 μm. Reference glaze compositions of Nos. 14–16 failed to gain a preferable glaze face because they crystallized or failed to vitrify, even with varying the temperature, the retention time or the other baking conditions.

The conventional glaze composition of No. 17 undesirably provided insufficient surface smoothness because the ends of glaze pattern were protuberant. Under the influence of the property of the ceramic substrate, the glazed substrate warped greatly.

Since the glaze composition of No. 18 contains a large amount of lead, the substrate for thin-film hybrid parts using this composition undesirably undergoes limitation in application so as to avoid the reduction and dissolution of lead.

surface roughness and the substrate warping. The protuberance dimension, which is the height of protuberance produced on the end portions of glaze covering, was obtained by measuring the difference in height between the flat surface portion of the glaze covering and the top of the end portions of glaze covering. The substrate warping was obtained by measuring the maximum height of the arcuate surface resulting from the warping of substrate.

TABLE 3

| NO. | GLAZE THICKNESS [μm] | PRO-TUBERABCE DIMENSION [μm] | AVERAGE SURFACE ROUGHNESS [μm] | SUBSTRATE WARPING [mm] |
|---|---|---|---|---|
| 1 | 20 | 1.2 | 0.04 | 0.10 |
| 2 | 20 | 0.9 | 0.04 | 0.10 |
| 17 | 20 | 2.5 | 0.05 | 0.30 |
| 18 | 20 | 2.0 | 0.04 | 0.25 |

Second Embodiment

To obtain the fusion having a composition shown in Table 4, orthoboric acid, aluminum hydroxide, silicon dioxide, calcium carbonate, strontium carbonate, barium carbonate, magnesium carbonate, lanthanum sesquioxide, zirconium dioxide, orthophosphoric acid, sodium carbonate, potassium carbonate and lead tetroxide were individually weighed and mixed in a mill. The mixture was melted in a platinum-rhodium crucible at 1300° C. to 1450° C. (2372° F. to 2642° F.) for three to five hours, and were then rapidly water-cooled. Consequently, the glaze compositions of Nos. 21–31 embodying the present invention, shown in Table 4, were prepared.

SECOND REFERENCE EXAMPLE

In the same way as the second embodiment, the glaze compositions of Nos. 32–35, outside the scope of the invention, and the conventional glaze compositions of Nos. 36–39, as shown in Table 4, were prepared.

Measurement

The glass softening point and the thermal expansion coefficient of the glaze compositions of Nos. 21–39 were measured in the same way as the first embodiment and the reference example. The measurement results are shown in Table 5.

TABLE 4

| | GLASS COMPOSITION [% BY WEIGHT] | | | | | | | | | |
|---|---|---|---|---|---|---|---|---|---|---|
| NO. | $B_2O_3$ | $Al_2O_3$ | $SiO_2$ | CaO | SrO | BaO | $Y_2O_3$ | $La_2O_3$ | $ZrO_2$ | OTHER COMPONENTS |
| EMBODIMENT | | | | | | | | | | |
| 21 | 27.7 | 11.8 | 10.4 | 15.1 | 9.8 | 6.2 | — | 18.8 | — | MgO:0.2 |
| 22 | 26.3 | 22.8 | 11.5 | 20.9 | 7.7 | — | — | 10.4 | — | MgO:0.3 |
| 23 | 23.1 | 22.9 | 10.1 | 14.7 | 9.5 | 6.0 | 13.4 | — | — | MgO:0.2 |
| 24 | 25.6 | 25.4 | 11.2 | 16.3 | 10.6 | 6.7 | — | — | 3.9 | MgO:0.3 |
| 25 | 22.4 | 22.3 | 9.8 | 14.3 | 9.2 | 5.9 | 6.5 | 9.4 | — | MgO:0.2 |
| 26 | 23.8 | 23.6 | 10.5 | 15.2 | 9.8 | 6.2 | 6.9 | — | 3.8 | MgO:0.2 |
| 27 | 33.4 | 24.4 | 7.2 | 13.5 | 8.7 | 5.0 | — | — | 7.8 | MgO:0.1 |
| 28 | 23.0 | 13.5 | 28.8 | 7.4 | 4.8 | 3.0 | — | 19.5 | — | — |
| 29 | 19.8 | 15.2 | 27.4 | 2.5 | 13.4 | 3.0 | — | 18.6 | — | — |
| 30 | 17.9 | 15.7 | 32.4 | 7.1 | 4.6 | 2.9 | — | 19.5 | — | — |
| 31 | 19.2 | 14.1 | 28.4 | 7.7 | 5.0 | 3.2 | — | 19.2 | — | $P_2O_5$:3.3 |
| REFERENCE | | | | | | | | | | |
| 32 | 20.1 | 20.0 | 8.8 | 12.8 | 8.3 | 5.3 | 24.6 | — | — | MgO:0.2 |
| 33 | 24.6 | 18.0 | 5.3 | 9.9 | 6.4 | 3.7 | — | 32.0 | — | MgO:0.1 |
| 34 | 27.3 | 20.0 | 5.9 | 11.0 | 7.1 | 4.1 | 24.6 | — | — | MgO:0.1 |
| 35 | 21.3 | 18.7 | 42.8 | 8.4 | 5.4 | 3.4 | — | — | — | — |
| 36 | 1.0 | 9.2 | 61.3 | 15.2 | 4.7 | 8.5 | — | — | — | MgO:0.2 |
| 37 | 1.8 | 10.4 | 45.9 | 5.7 | 19.8 | 7.8 | 8.6 | — | — | — |
| 38 | — | 8.8 | 53.9 | 13.1 | — | 11.2 | — | 13.0 | — | — |
| 39 | 18.1 | 4.9 | 39.0 | 6.0 | 1.0 | 9.0 | — | — | — | $Na_2O$:3.0, $K_2O$:1.0, PbO:18.0 |

TABLE 5

| NO. | GLASS SOFTENING POINT [° C.] | THERMAL EXPANSION COEFFICIENT [1/K] | BAKING TEMPERATURE [° C.] | NOTES |
|---|---|---|---|---|
| EMBODIMENT | | | | |
| 21 | 738 | $7.4 \times 10^{-8}$ | 880 | SMALL WARP |
| 22 | 755 | $7.3 \times 10^{-8}$ | 880 | ↑ |
| 23 | 776 | $7.7 \times 10^{-8}$ | 880 | ↑ |
| 24 | 752 | $6.9 \times 10^{-8}$ | 850 | ↑ |
| 25 | 770 | $7.3 \times 10^{-8}$ | 950 | ↑ |
| 26 | 768 | $7.2 \times 10^{-8}$ | 900 | ↑ |
| 27 | 750 | $6.2 \times 10^{-8}$ | 970 | ↑ |
| 28 | 821 | $5.6 \times 10^{-8}$ | 900 | ↑ |
| 29 | 845 | $5.8 \times 10^{-8}$ | 950 | ↑ |
| 30 | 833 | $5.7 \times 10^{-8}$ | 930 | ↑ |
| 31 | 802 | $5.8 \times 10^{-8}$ | 950 | ↑ |
| REFERENCE | | | | |
| 32 | 787 | — | CRYSTALLIZE | UNABLE TO GLAZE |
| 33 | 748 | $7.4 \times 10^{-8}$ | CRYSTALLIZE | ↑ |
| 34 | 772 | $8.0 \times 10^{-8}$ | CRYSTALLIZE | ↑ |
| 35 | 860 | $4.7 \times 10^{-8}$ | 1000 | LARGE WARP |
| 36 | 970 | $6.0 \times 10^{-8}$ | 1240 | LARGE WARP (CONVENTIONAL) |
| 37 | 940 | $6.5 \times 10^{-8}$ | 1220 | ↑ |
| 38 | 999 | $6.2 \times 10^{-8}$ | 1250 | ↑ |
| 39 | 790 | $5.5 \times 10^{-8}$ | 1020 | ↑ |

Subsequently, from glaze compositions of Nos. 21–39, in the same way as the first embodiment and the reference example, the glazed substrates were prepared.

The glaze condition and substrate warp of the glazed substrates were observed.

As clearly shown in Tables 4 and 5, the glaze compositions of Nos. 21–31 of the second embodiment, low melting glasses, have a glass softening point of 840° C. (1544° F.) or lower. Therefore, the baking temperature can be about 980° C.(1796° F.) or lower. The aforementioned specified amount of oxides is added to the compositions. Therefore, the vitreous thermal expansion coefficient of 5.6 to $7.7 \times 10^{-6}$ was made close to the thermal expansion coefficient of the alumina substrates of about 7 to $8 \times 10^{-6}$. Only small warping of the glazed substrates was observed, and such a degree of warping does not affect practical use. The glaze portion of the glazed substrate had a large area but only had a little protuberance, thereby providing surface smoothness. Further, the glazed substrates of the second embodiment have a lustrous glaze face and are appropriate for use in thin-film hybrid parts.

The glaze compositions of Nos. 32–35, outside the scope of the invention, failed to gain a preferable glaze face because they crystallized or failed to vitrify, even with varying of the temperature, the retention time or the other baking conditions. Especially, the reference glaze composition of No. 35 undesirably resulted in a large warping of the glazed substrate. Conventional glaze compositions of Nos. 36–38 require a high baking temperature equal to or over 1020° C. (1868° F.) during glazing. Further, the ends of the glaze pattern were protuberant, and the glazed substrates warped greatly.

Third Embodiment

To obtain the fusion having a composition shown in Table 6, orthoboric acid, aluminum hydroxide, calcium carbonate, strontium carbonate, barium carbonate, magnesium carbonate, silicon dioxide, orthophosphoric acid, sodium carbonate, potassium carbonate and lead tetroxide were individually weighed and mixed in a mill. The mixture was melted in a platinum-rhodium crucible at 1200° C. to 1450° C. (2192° F. to 2642° F.) for three to five hours, and were then rapidly water-cooled. Consequently, the glaze compositions of Nos. 41–51 embodying the present invention, shown in Table 6, were prepared.

THIRD REFERENCE EXAMPLE

In the same way as the third embodiment, reference glaze compositions of Nos. 52–56, outside the scope of the invention, and the conventional glaze compositions of Nos. 57–58, as shown in Table 6, were prepared.

TABLE 6

| NO. | $B_2O_3$ | $Al_2O_3$ | $SiO_2$ | CaO | SrO | BaO | $P_2O_5$ | OTHER COMPONENTS |
|---|---|---|---|---|---|---|---|---|
| EMBODIMENT | | | | | | | | |
| 41 | 36.1 | 19.8 | 15.6 | 21.1 | 7.8 | 5.0 | 3.7 | — |
| 42 | 34.7 | 19.1 | 15.0 | 11.7 | 7.5 | 4.8 | 7.2 | — |
| 43 | 33.4 | 18.4 | 14.4 | 11.2 | 7.3 | 4.6 | 10.7 | — |
| 44 | 27.0 | 20.0 | 19.6 | 11.0 | 7.1 | 4.5 | 10.8 | MgO:0.2 |
| 45 | 25.5 | 18.7 | 23.8 | 10.3 | 6.6 | 4.2 | 10.9 | — |
| 46 | 21.7 | 19.0 | 32.7 | 9.3 | 6.0 | 3.8 | 7.5 | — |
| 47 | 20.0 | 17.6 | 37.2 | 8.6 | 5.6 | 3.5 | 7.6 | — |
| 48 | 20.3 | 19.6 | 23.9 | 14.1 | 9.1 | 5.8 | 7.3 | — |
| 49 | 15.9 | 13.7 | 32.9 | 14.6 | 9.4 | 6.0 | 7.5 | — |
| 50 | 31.5 | 17.3 | 13.6 | 3.7 | 19.5 | 4.3 | 10.1 | — |
| 51 | 22.6 | 17.4 | 31.3 | 2.9 | 15.3 | 3.4 | 7.2 | — |
| REFERENCE | | | | | | | | |
| 52 | 30.9 | 17.0 | 13.3 | 10.4 | 6.7 | 4.3 | 17.4 | — |
| 53 | 18.3 | 13.4 | 41.7 | 7.4 | 4.8 | 3.0 | 11.5 | — |
| 54 | 28.6 | 27.7 | 32.6 | 5.1 | 1.4 | 4.9 | — | — |
| 55 | 18.2 | 16.0 | 42.0 | 7.8 | 5.1 | 3.2 | 7.7 | — |
| 56 | 21.4 | 20.9 | 6.2 | 5.4 | 4.3 | 41.9 | — | — |
| 57 | 1.0 | 9.2 | 61.3 | 15.2 | 4.7 | 8.5 | — | MgO:0.2 |
| 58 | 18.1 | 4.9 | 39.0 | 6.0 | 1.0 | 9.0 | — | $Na_2O$:3.0, $K_2O$:1.0, PbO:18.0 |

GLASS COMPOSITION [% BY WEIGHT]

Measurement

The glass softening point and the thermal expansion coefficient of the glaze compositions of Nos. 41–58 were measured in the same way as the first embodiment and the reference example. The measurement results are shown in

TABLE 7

| NO. | GLASS SOFTENING POINT[° C.] | THERMAL EXPANSION COEFFICIENT[1/K] | BAKING TEMPERATURE [° C.] | NOTES |
|---|---|---|---|---|
| EMBODIMENT | | | | |
| 41 | 763 | $5.8 \times 10^{-8}$ | 880 | EXCELLENT GLAZE FACE |
| 42 | 766 | $6.0 \times 10^{-8}$ | 880 | ↑ |

TABLE 7-continued

| NO. | GLASS SOFTENING POINT[° C.] | THERMAL EXPANSION COEFFICIENT[1/K] | BAKING TEMPERATURE [° C.] | NOTES |
|---|---|---|---|---|
| 43 | 754 | $6.0 \times 10^{-8}$ | 880 | ↑ |
| 44 | 720 | $6.2 \times 10^{-8}$ | 850 | ↑ |
| 45 | 810 | $6.2 \times 10^{-8}$ | 950 | ↑ |
| 46 | 772 | $5.5 \times 10^{-8}$ | 900 | ↑ |
| 47 | 820 | $5.5 \times 10^{-8}$ | 970 | ↑ |
| 48 | 750 | $6.3 \times 10^{-8}$ | 900 | ↑ |
| 49 | 780 | $5.8 \times 10^{-8}$ | 950 | ↑ |
| 50 | 760 | $6.3 \times 10^{-8}$ | 930 | ↑ |
| 51 | 800 | $5.6 \times 10^{-8}$ | 950 | ↑ |
| REFERENCE | | | | |
| 52 | 752 | $6.2 \times 10^{-8}$ | 930 | UNABLE TO GLAZE |
| 53 | — | — | — | GLASS EMULSIFIED |
| 54 | — | — | — | NOT VITRIFIED |
| 55 | 860 | $4.7 \times 10^{-8}$ | 1000 | UNABLE TO GLAZE |
| 56 | 727 | $8.1 \times 10^{-8}$ | CRYSTALLIZE | ↑ |
| 57 | 940 | $6.0 \times 10^{-8}$ | 1240 | DEFECTIVE GLAZE FACE |
| 58 | 790 | $5.5 \times 10^{-8}$ | 1020 | DEFECTIVE GLAZING PROPERTY |

Subsequently, from the glaze compositions of Nos. 41–58, in the same way as the first embodiment and the reference the example, the glazed substrates were prepared.

The glaze condition and substrate warping of the glazed substrates were observed.

As clearly shown in Tables 6 and 7, the glaze compositions of Nos. 41–51 of the third embodiment are low-melting glasses having a glass softening point of about 830° C. (1526° F.) or lower. Therefore, the baking temperature can be about 980° C. (1796° F.) or lower. No remarkable warping was seen on the glazed substrates. The glaze portion of the glazed substrates had a large area but only had a little protuberance, thereby providing a smooth surface. Further, the glazed substrates of the third embodiment had a lustrous glaze face and preferably had no irregularities or protrusions on the surface thereof.

The glaze compositions of Nos. 52–56, outside the scope of the invention, failed to gain a preferable glaze face because they crystallized or failed to vitrify, even with varying of the temperature, the retention time or the other baking conditions. The conventional glaze composition of No. 57, a high melting glass composed mainly of silicate, requires a high baking temperature equal to or greater than 1240° C. (2264° F.) during glazing. Further, glaze composition of No. 57 unfavorably resulted in a protuberant glaze pattern and a greatly warped glazed substrate. The conventional glaze composition of No. 58 provides a desirable glaze face but unfavorably has unstable electrical and chemical properties, because lead and an alkaline metal are included.

This invention has been described above with reference to preferred embodiments as shown in the tables. Modifications and alterations may become apparent to one skilled in the art upon reading and understanding the specification. Despite the use of the embodiments for illustration purposes, it is intended to include all such modifications and alterations within the spirit and the scope of the appended claims.

As aforementioned, the present invention can provide a low-melting $B_2O_3$—$Al_2O_3$—RO system or $B_2O_3$—$Al_2O_3$—$P_2O_5$—RO system glaze composition which is superior in chemical durability, electric insulation and surface smoothness even when the glaze layer is thin. As compared with conventional glaze compositions, the glaze composition of the present invention can assure the manufacture of a glazed substrate at a low glazing temperature.

Further, the glaze composition of the present invention contains a specified amount of oxides as aforementioned. Therefore, the difference in the thermal expansion coefficient between the glaze composition and the ceramic substrate is reduced. The glazed substrate is further prevented from warping. Remarkably advantageously, according to the invention, thin-film chips and other electronic parts can be easily manufactured. The glaze protuberances on the glazed substrate can also be reduced.

When the glaze composition of the invention contains a specified amount of phosphorus pentoxide, the surface smoothness of the glaze face can be enhanced. The glazed substrate resulting from the glaze composition of the invention is suitable for use in chips.

The glaze composition of the invention can also be used for the conventional facsimile thermal heads, thermal printer heads or other components unless an especially high thermal resistance is demanded.

When the glaze composition of the invention has a low melting point, it can be used for use in vitreous material for coating or sealing multi-layered ceramic substrates.

What is claimed is:

1. A glazed ceramic substrate having a glaze formed from a composition consisting of the following components, on the basis of oxide weight:

20% to 50% by weight of boron oxide;
   5% to 35% by weight of aluminum oxide;
   greater than 0% up to less than 40% by weight of silicon dioxide;
   greater than 0% up to less than 8% by weight of zinc oxide; and
   15% to 55% by weight of at least one alkaline-earth oxide selected from the group consisting of calcium oxide, strontium oxide, magnesium oxide and barium oxide.

2. A glaze composition according to claim 1, wherein said alkaline-earth oxide comprises, on a basis of oxide weight, 1.5% to 30% by weight of calcium oxide, greater than 0% up to less than 30% by weight of strontium oxide, greater than 0% up to less than 10 by weight of magnesium oxide and greater than 0% up to less than 45% by weight of barium oxide.

3. A glazed ceramic substrate according to claim 1, wherein the ceramic substrate is an alumina substrate.

4. A glazed ceramic substrate according to claim 1, wherein said ceramic substrate has a thickness of 0.635 mm or less.

5. A glazed ceramic substrate according to claim 1, wherein the thickness of the glaze layer is from about 5 µm to about 25 µm.

6. A glazed ceramic substrate having a glaze formed from a composition according to claim 1, wherein the glaze has a thermal expansion coefficient at 30 to 400° C. of from about $5.3 \times 10^{-6}$ to about $7.7 \times 10^{-6}$/K.

7. A glazed ceramic substrate as in claim 1, wherein the composition forming the glaze contains, on the basis of oxide weight:
   5% to 40% by weight of $SiO_2$; and
   1% to 8% by weight of ZnO.

8. A glazed ceramic substrate having a glaze formed from a composition consisting essentially of, on a basis of oxide weight, the following components:
   15% to 35% by weight of boron oxide;
   10% to 30% by weight of aluminum oxide;
   5% to 40% by weight of silicon dioxide;
   10% to 40% by weight of at least one alkaline-earth oxide selected from the group consisting of calcium oxide, strontium oxide and barium oxide; and
   3% to 30% by weight of at least one oxide, said at least one oxide being selected from the group consisting of 30% or less by weight of lanthanum sesquioxide, 20% or less by weight of yttrium oxide and 10% or less by weight of zirconium dioxide, with the total of said components comprising at least 90% by weight of the entire glaze composition.

9. A glazed ceramic substrate having a glaze formed from a composition according to claim 8, wherein said alkaline-earth oxide comprises 1.5% to 30% by weight of calcium oxide, 20% or less by weight of strontium oxide and 10% or less by weight of barium oxide.

10. A glazed ceramic substrate as in claim 8, wherein the composition forming the glaze contains, on the basis of oxide weight:
    1% to 20% by weight of $Y_2O_3$; and
    1% to 10% by weight of ZnO; and by weight of at least one alkaline-earth oxide selected from the group consisting of calcium oxide, strontium oxide, magnesium oxide and barium oxide.

11. A glazed ceramic substrate having a glaze formed from a composition, consisting essentially of the following components, on the basis of oxide weight:
    15% to 40% by weight of boron oxide;
    10% to 30% by weight of aluminum oxide;
    0.5% to 11% by weight of phosphorus pentoxide;
    40% or less by weight of silicon dioxide; and
    10% to 55% by weight of at least one alkaline-earth oxide selected from the group consisting of calcium oxide, strontium oxide and barium oxide, with the content ratio of said alkaline-earth oxide to said phosphorus pentoxide being larger than 1.9 and less than 9.2.

12. A glazed ceramic substrate having a glaze formed from a composition according to claim 11, wherein said alkaline-earth oxide comprises 1.5% to 25% by weight of calcium oxide, 20% or less by weight of strontium oxide and 10% or less by weight of barium oxide.

13. A glazed ceramic substrate having a glaze formed from a composition consisting of the following components, on the basis of oxide weight;
    20% to 42% by weight of boron oxide;
    5% to 35% by weight of aluminum oxide;
    5% to 40% by weight of silicon dioxide;
    greater than 0% up to less than 8% by weight of zinc oxide; and
    15% to 55% by weight of at least one alkaline-earth oxide selected from the group consisting of calcium oxide, strontium oxide, magnesium oxide and barium oxide.

14. A glazed ceramic substrate as in claim 13, wherein the composition forming the glaze contains, on the basis of oxide weight;
    1% to 8% by weight of ZnO.

15. A glazed ceramic substrate having a glaze formed from a composition consisting of the following components, on the basis of oxide weight:
    20% to 50% by weight of boron oxide;
    5% to 35% by weight of aluminum oxide;
    greater than 0% up to less than 40% by weight of silicon dioxide:
    greater than 0% up to less than 8% by weight of zinc oxide;
    15% to 55% by weight of at least one alkaline-earth oxide selected from the group consisting of calcium oxide, strontium oxide, magnesium oxide and barium oxide;
    greater than 0% up to less than 2% by weight of alkaline metal oxide; and
    greater than 0% up to less than 10% by weight of lead oxide.

16. A glazed ceramic substrate as in claim 15, wherein the composition forming the glaze contains, on the basis of oxide weight:
    5% to 40% by weight of $SiO_2$;
    1% to 8% by weight of ZnO;
    0.1% to 2% by weight of alkaline metal oxide; and
    0.1% to 10% by weight lead oxide.

17. A glazed ceramic substrate having a glaze formed from a composition consisting essentially of the following components, on the basis of oxide weight:
    25% to 38% by weight of boron oxide;
    greater than 0% up to less than 8% by weight of zinc oxide;
    15% to 30% by weight of silicon dioxide; and
    25% to 55% by weight of at least one alkaline-earth oxide selected from the group consisting of calcium oxide, strontium oxide and barium oxide, with the total amount of said components comprising at least 90% by weight of the entire glaze composition.

18. A glazed ceramic substrate having a glaze according to claim 17, in which alkaline-earth oxide comprises, on the basis of oxide weight, 1.5% to 30% by weight of calcium oxide, greater than 0% up to less than 30 by weight of strontium oxide, greater than 0% up to less than 10% by weight of magnesium oxide and greater than 0% up to less than 45% by weight of barium oxide.

19. A glazed ceramic substrate as in claim 17, wherein the composition forming the glaze contains, on the basis of oxide weight:
    1% to 8% by weight of ZnO.

20. A glazed ceramic substrate having a glaze formed from a composition consisting essentially of, on the basis of oxide weight, of the following components:
    15% to 35% by weight of boron oxide;
    10% to 30% by weight of aluminum oxide;
    5% to 40% by weight of silicon dioxide;
    10% to 40% by weight of at least one alkaline-earth oxide selected from the group consisting of calcium oxide, strontium oxide and barium oxide; and 2% to 20% by weight of at least one oxide, said at least one oxide being selected from the group consisting of 20% or less by weight of lanthanum sesquioxide and 20% or less by weight of yttrium oxide, with the total amount of said components comprising at least 90% by weight of the entire glaze composition.

21. A glazed ceramic substrate having a glaze formed from a composition consisting essentially of the following components, on the basis of oxide weight:

20% to 40% by weight of boron oxide;

10% to 20% by weight of aluminum oxide;

0.5 to 11% by weight of phosphorus pentoxide;

10% to 40% by weight of silicon dioxide; and

10% to 55% by weight of at least one alkaline-earth oxide selected from the group consisting of calcium oxide, strontium oxide and barium oxide, and the content ratio of said alkaline-earth oxide to said phosphorus pentoxide being larger than 1.9 and less than 9.2.

* * * * *